United States Patent
Breerwood et al.

(10) Patent No.: US 11,598,179 B2
(45) Date of Patent: Mar. 7, 2023

(54) NON-PENETRATION CONNECTION OF DOWNHOLE DEVICE TO TUBING ENCASED CONDUCTOR

(71) Applicant: Halliburton Energy Services, Inc., Houston, TX (US)

(72) Inventors: Glen P. Breerwood, Tomball, TX (US); Paul Gregory James, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 335 days.

(21) Appl. No.: 16/872,023

(22) Filed: May 11, 2020

(65) Prior Publication Data

US 2021/0032960 A1  Feb. 4, 2021

Related U.S. Application Data (60) Provisional application No. 62/880,439, filed on Jul. 30, 2019.

(51) Int. Cl.
*E21B 41/00* (2006.01)
*H02J 50/00* (2016.01)
(Continued)

(52) U.S. Cl.
CPC ...... *E21B 41/0085* (2013.01); *E21B 17/0283* (2020.05); *E21B 47/13* (2020.05); *H02J 50/005* (2020.01); *H02J 50/10* (2016.02)

(58) Field of Classification Search
CPC .............. E21B 41/0085; E21B 17/028; E21B 17/0283; E21B 47/13
See application file for complete search history.

(56) References Cited

U.S. PATENT DOCUMENTS 5,971,071 A  10/1999  Mariaggi et al.
9,000,873 B2  4/2015  Deville et al.
(Continued)

FOREIGN PATENT DOCUMENTS

EP  2335095 A1  6/2011
WO  2015069396 A1  5/2015
(Continued)

OTHER PUBLICATIONS

International Search Report and Written Opinion for PCT application PCT/US2020/032574 dated Aug. 25, 2020, 12 pages.

*Primary Examiner* — Kristyn A Hall
(74) *Attorney, Agent, or Firm* — Kilpatrick Townsend & Stockton LLP (57) ABSTRACT

A system is provided for providing power and/or communication to/from a downhole device by inductively coupling a coupling conductor within a receiver to a core conductor of a tubing encased conductor (TEC). The receiver has an elongated housing arranged physically proximate or touching an outer surface of the TEC. A coupling conductor is disposed within the housing, extends substantially parallel to a longitudinal axis of the housing, and further extends longitudinally and in close proximity to a core conductor housed within the TEC when the housing is arranged physically proximate or touching the outer surface of the TEC. This exposes the coupling conductor to a magnetic field formed externally to the TEC to excite a current in the coupling conductor. In one or more embodiments, the receiver further includes a coupling to electrically couple the downhole device to the coupling conductor and deliver the current to the downhole device.

20 Claims, 4 Drawing Sheets

(51) Int. Cl.
*H02J 50/10* (2016.01)
*E21B 17/02* (2006.01)
*E21B 47/13* (2012.01)

(56) References Cited

U.S. PATENT DOCUMENTS

2009/0178804 A1    7/2009  Freeman
2015/0122493 A1*  5/2015  Wood .................... E21B 34/066
                                                                    166/279
2019/0044574 A1    2/2019  Majid

FOREIGN PATENT DOCUMENTS

WO          2016108845 A1    7/2016
WO          2016177996 A1   11/2016
WO     WO-2018118028 A1    6/2018

* cited by examiner

NON-PENETRATION CONNECTION OF DOWNHOLE DEVICE TO TUBING ENCASED CONDUCTOR

CROSS REFERENCE TO RELATED APPLICATIONS

This application claims priority to U.S. Patent Application Ser. No. 62/880,439 filed Jul. 30, 2019 which is incorporated herein by reference in its entirety.

BACKGROUND

Field of the Disclosure

The present disclosure relates to non-penetration connection of a downhole device to a tubing encased conductor (TEC), and more particularly, to a mounted receiver for inductive coupling between the TEC and a downhole device.

Description of Related Art

Tubing encased conductors (TECs) are placed downhole in a wellbore for providing power to downhole devices from the surface and transmitting data from downhole devices back to the surface. Among the downhole devices are sensors. It can be desirable to place sensors at multiple locations along the wellbore. Placement of each sensor along the TEC can include creating a splice, join, or new termination in the TEC. Each sensor can require as many as three points for connecting to a power cable in the TEC. This results in three points in which integrity of the TEC is breached, and then sealed. Each of these points is at risk of leaking wellbore fluids into the core of the TEC, resulting in a short circuit. A single leak could cause failure of the entire downhole system powered by the TEC. Thus, the reliability of the entire downhole system powered by the TEC is a function of the reliability of each of these points.

Another method of powering a sensor via TEC uses an electromagnetic coupling that requires coils to fully encircle the TEC. The coils intensify the magnetic fields and improve transmission efficiency. Mounting such coils requires access to a termination and can be a cumbersome procedure. Due to the coaxial nature of power transmission through coils, an apparatus configured with the coils tends to be physically larger than the TEC. Typical operation consists of mounting a coil in electrical contact with the TEC conductor and placing the receiving coil either inside of or around the coil connected to the TEC. This can result in a physically large structure that may be difficult to install in the limited space available in a wellbore. Adding sensors to a particular location, without cutting and splicing the TEC, can be hindered by intervening coils. Due to the size and structure of these coil arrangements, once mounted, the mounted arrangement tends to be delicate and prone to damage if not handled with extreme care.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE EMBODIMENTS

The illustrated embodiments are now described more fully with reference to the accompanying drawings wherein like reference numerals identify similar structural/functional features. The illustrated embodiments are not limited in any way to what is illustrated, as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

A system and method are provided for providing power to and/or communication to and/or from a downhole device by inductively coupling a coupling conductor within a receiver to a core conductor of a tubing encased conductor (TEC).

Figure 1:
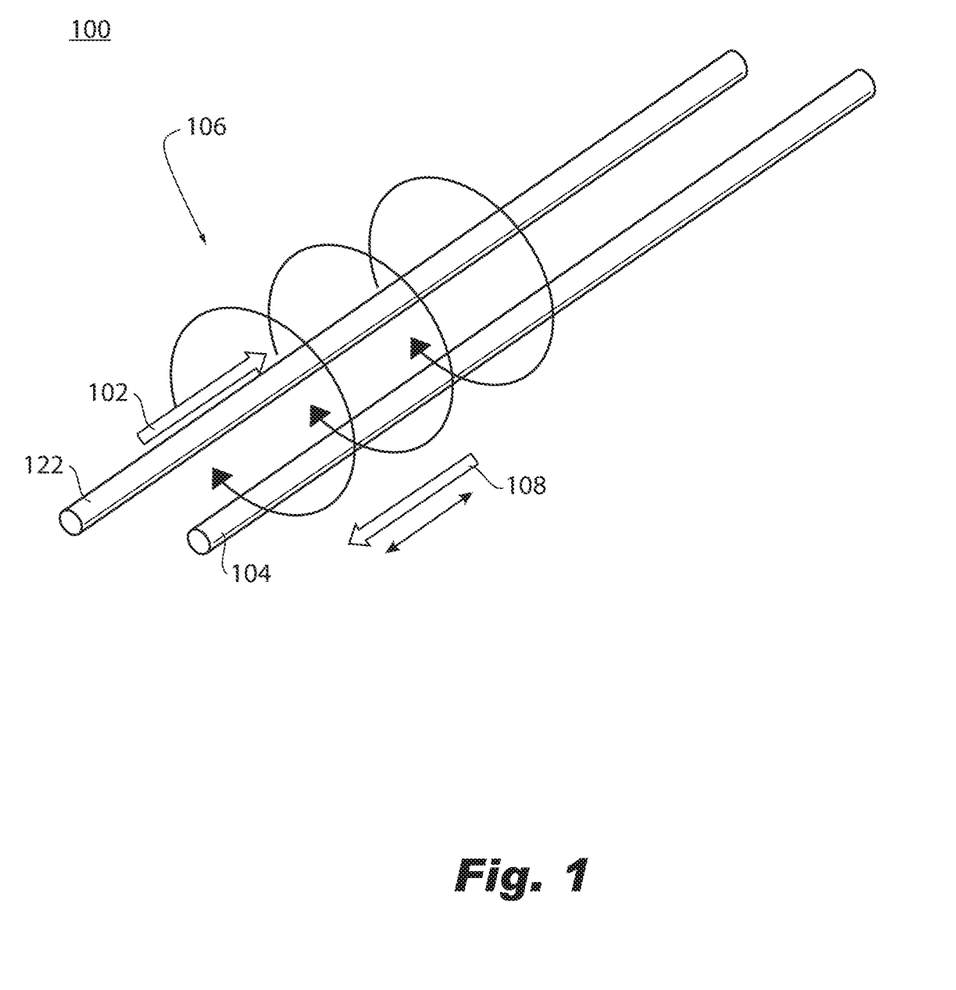
FIG. 1 shows a schematic diagram of an example of induction coupling between a tubing encased conductor (TEC) and a receiver in accordance with embodiments of the disclosure.

Turning now descriptively to the drawings, in which similar reference characters denote similar elements throughout the several views, FIG. 1 shows an inductive coupling relationship 100 between a conductor of TEC 122 and a coupling conductor 104. A large AC current 102 flowing through the TEC 120 generates a magnetic field 106 about the TEC 120. When the coupling conductor 104 is sufficiently proximate to the TEC 120, an induction current 108 is induced in coupling conductor 104.

The coupling conductor 104 is configured to extend along the longitudinal axis and in close proximity to a conductor housed within the TEC 120 for exposing the coupling conductor 104 to the magnetic field 106 formed externally to the TEC 120 for exciting the induction current 108 in the coupling conductor 104.

In one or more embodiments, the coupling conductor 104 is configured to partially encircle the TEC 120. The coupling conductor 104 can include a plurality of coils that together form a toroid (that encircles the TEC 120) or a partial toroid (that partially encircles the TEC 120). When encircling the TEC 120, the coupling conductor 104 is able to open and close (e.g., due to flexibility or a hinge) in order to be placed in position at a selected position of the TEC 120 without dismantling the TEC 120. The coils can have legs that extend along the longitudinal axis of the TEC 120 as the coils at least partially encircle the TEC 120. In one or more embodiments, the coils are configured so that the legs of each coil form approximately a large majority (e.g., about 90%) of the coil and extend parallel to the longitudinal axis of the TEC 120, with only a very small minority (e.g., about 10%) of each coil forming a bend at a top and bottom of the coil.

In one or more embodiments, the coupling conductor 104 is oriented parallel to the TEC 120 along the entire length of the coupling conductor 104 or a substantial length of the coupling conductor 104.

The proximity coupling is different from a winding-produced inductive coupling, as it is based on a proximity relationship between conductors. In a winding-produced inductive coupling, continuous windings that form an annulus 360 degrees around a flowing current are used to intentionally produce a current. On the other hand, the proximity coupling is inefficient and normally unwanted, treated as a harmful problem that is actively avoided or eliminated. Cables with large currents flowing through them are typically shielded to avoid any coupling that could introduce noise and losses. Data cables are normally shielded to isolate them from this proximity coupling effect or are arranged in twisted pairs to cancel and negate this effect. Further, ferrite cores or chokes are commonly used on data cables to further eliminate noise produced by this proximity coupling effect.

In a downhole environment, the TEC 120 has a large current flowing through it. Although the proximity coupling is inefficient, producing only a small induction current 108 and causing a correspondingly small loss of power, the induction current 108 is sufficient for a low-powered downhole device, such as a sensor or a gauge, and the losses to the current flowing through the TEC 120 are tolerable.

Advantages through proximity coupling particular to downhole applications have been discovered. The disclosure cultivates, rather than avoids, proximity coupling for downhole applications. The advantages include elimination of the need to breach the outer surface (which guards pressure integrity of the TEC 120) during deployment of downhole devices, which improves reliability of the downhole system and reduces the possibility of short circuits due to malfunction of a downhole device or a breach of the TEC 120. Further advantages include ease of downhole device deployment, repeatability for deployment of additional downhole devices, and flexibility of location of deployment of downhole devices. Moreover, due to the inefficient coupling, in the event that the downhole device fails, the maximum draw that the device can place on the TEC 120 as a whole is very small. This effectively limits the impact of any single device failure in the system.

Figure 2:
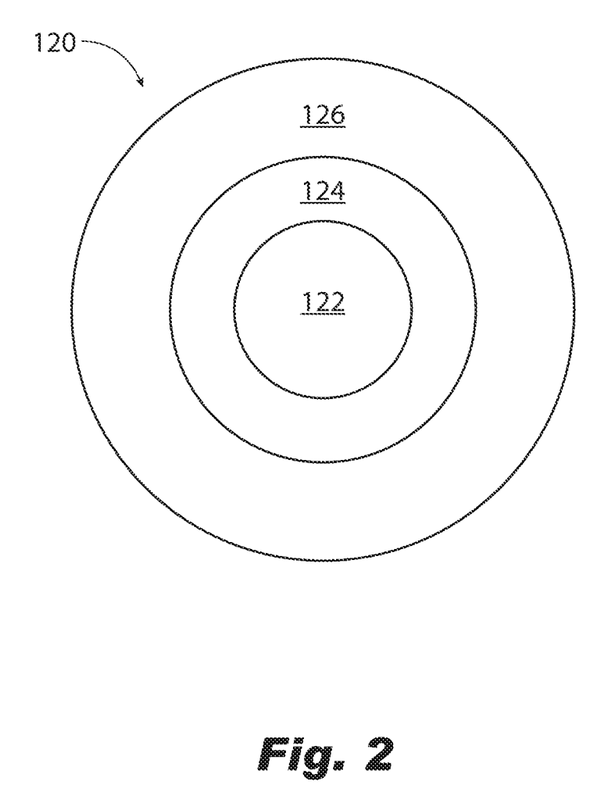
FIG. 2 shows a cross-section diagram of a TEC.

With reference to FIG. 2, a cross-sectional view is shown of TEC 120 employed to power and provide a communication path for electrical downhole devices placed in a wellbore (not shown), in accordance with one or more embodiments. As shown, the TEC 120 includes, at a minimum, a core conductor 122, an intermediate layer 124, and an outer tubular 126. The core conductor 122 provides an electrical path to supply power to electrical downhole devices (e.g., downhole device 306 via connecting cable 308 shown in FIG. 3). Additionally, as described further in the discussion of FIG. 3, TEC 120 and connecting cable 308 can provide a communication path between the downhole device and a remote system in communication with the TEC 120, e.g., a system disposed within or at a surface of the wellbore, to send or receive data. The core conductor 122 may be a conductive material such as copper or a copper alloy. The core conductor 122 may also be a stranded wire or a solid wire that runs the length of the tubing-encased cable 120. The core material cable may also be formed of multiple concentric layers. Although not shown, one or more additional conductors can also be used in the vicinity of the core conductor 122 to provide shielding or change the impedance of the cable 120.

Figure 3:
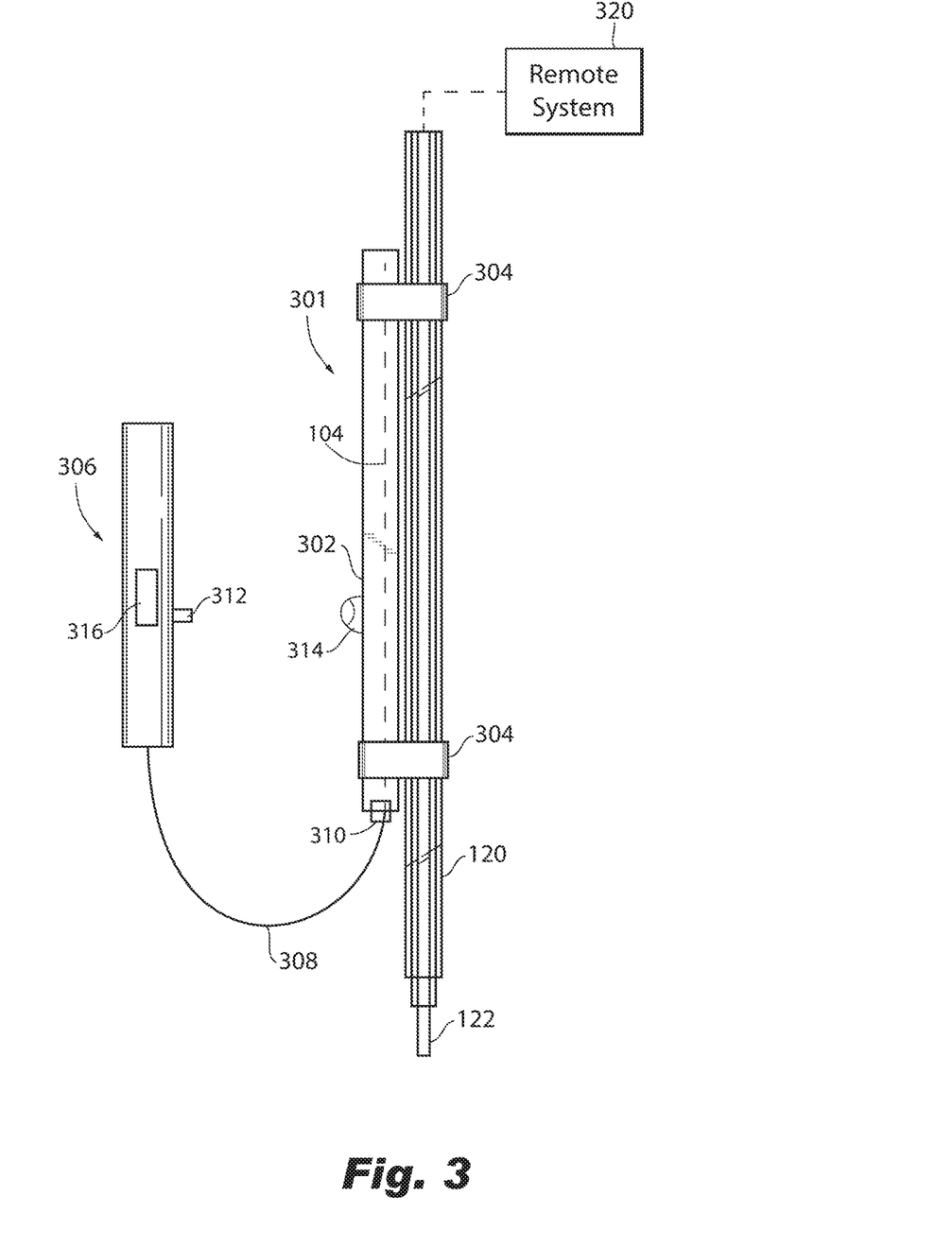
FIG. 3 shows a schematic diagram of a downhole device coupled to a receiver that is inductively coupled to a TEC.

With reference to FIG. 3, a receiver assembly 301 includes a housing 302 housing the coupling conductor 104. The receiver assembly 301 is positioned to hold the housing 302 in close proximity to the TEC 120. Once exposed to a magnetic field from the TEC 120, an induction current is excited in the coupling conductor 104. This induction current can be used to power a downhole device 306. In one or more embodiments, the induction current can also provide a data communication path. One method by which the induction current could be used for data transmission includes power demand encoding.

In one or more embodiments, positioning of the receiver assembly 301 can be accomplished by mechanically bolting or clamping the receiver assembly 301 to the TEC 120. In one or more embodiment, the receiver assembly 301 can be placed in close proximity or attached to the TEC 120 using a fastener 304, such as a band or clamp (either metallic or non-metallic), an adhesive, or a strapping type material that is wrapped, e.g., helically, but without limitation to a particular style of wrapping, about the receiver assembly 301 and the TEC 120. Alternatively, the TEC 120 and receiver assembly 301 may be installed in a groove or channel running through or across another piece of downhole equipment, such as a bypass slot of an interval control valve, a blast joint, production screens, or within a tubing clamp.

In one or more embodiments, a connecting cable 308 may be provided that couples to the coupling conductor 104 via first interface(s) 310. Interface(s) 310 include one or more first interfaces that can mate or otherwise cooperate with one another to provide a physical and electrical coupling between connecting cable 308 and coupling conductor 104. In one or more embodiments, connecting cable 308 and coupling conductor 104 can be a single cable without an interface between them.

The connecting cable 308 further couples the coupling conductor 104 or the receiver assembly 301 to the downhole device 306. The connecting cable 308 can be configured with any length and can be used to facilitate positioning of the downhole device 306 at a convenient location remote from the receiver assembly 301, if desired.

Alternatively, receiver assembly 301 may be connected to the downhole device 306 directly, or they may be integrated into a single assembly.

In one or more embodiment, the downhole device 306 can include a second interface 312 that mates or otherwise cooperates with a port 314 provided on a housing of the receiver assembly 301 to provide a physical and/or electrical coupling between downhole device 306 and the housing of receiver assembly 301. The additional port 312 may be used to connect to additional downhole devices 306, allowing the receiver assembly 301 to service a plurality of devices. The first and second interfaces 310 and 312 and port 314 are shown by way of example only and are not limited to a particular configuration.

The downhole device 306 may be any device requiring electrical power or receiving or transmitting a signal with a remote system communicating via the TEC 120 with the downhole device 306. For example, the downhole device 306 can be a permanent downhole pressure or temperature gauge or a position sensor interface unit.

A remote system 320 is shown that is remote from the downhole device 306 and is in electrical communication with the TEC 120. In one or more embodiments, the downhole device 306 can communicate with remote system 320 using methods, such as power line communication, current modulation, or switched load transmission. Information communicated from the remote device 320 to the downhole device 306 can include, for example, control or configuration data. Information communicated from the downhole device 306 to the remote system can include, for example, measurement data or status information.

The communication path between the downhole device 306 and the TEC can be via the coupling conductor 104 and the connecting cable 308 without need for additional conductors. The downhole device 306 can include a communication module 316 that encodes and/or decodes. In one or more embodiments, provided as an example and without limiting methods of communication, communication to the downhole device 306 can be encoded in the AC signal being pushed down the TEC 120 and decoded by the communication module 316.

In one or more embodiments, provided as an example and without limiting methods of communication, communication from the downhole device 306 can be encoded by the communication module 316 by varying the power demand for the signal sent to the downhole device 306 from the TEC 120. One way of varying the power demand is by switching a load in and out of receiving current delivered by the connecting cable 308. The remote system 320 can monitor the power being consumed and pull the data from the varying power consumption using a decoding scheme.

In one or more embodiments, the downhole device 306 may contain a data transfer system (not shown) that will allow transmission of data via means other than electrical signals through the TEC 120. These may include acoustic data transmission through fluids, acoustic data transmission through pipe, or radio frequency communication.

Figure 4:
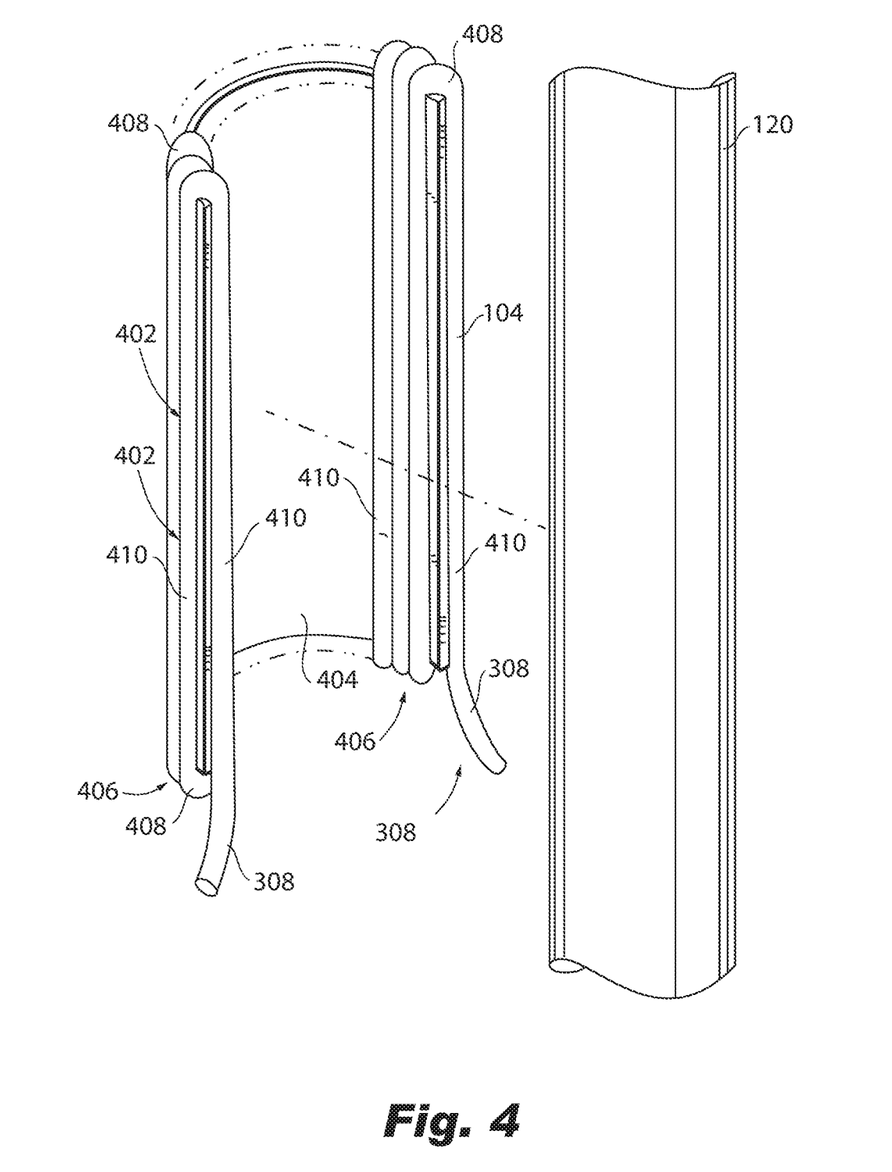
FIG. 4 shows a schematic diagram of the TEC and downhole device coupled to a receiver that is inductively coupled to a TEC.

With reference to FIG. 4, the coupling conductor 104 is configured to at least partially encircle the TEC 120. The housing 302 surrounding the coupling conductor 104 has been omitted from FIG. 4 for clarity. The coupling conductor 104 can include a plurality of loops or coils 402 that together form a toroid (that encircles the TEC 120) or a partial toroid (that partially encircles the TEC 120). When encircling the TEC 120, the coupling conductor 104 and housing 302 may be configured to open and close (e.g., due to flexibility or provision of a hinge) in order to be placed in position at a selected position of the TEC 120 without dismantling the TEC 120.

The coils 402 may encircle a core 404 material to facilitate winding the loops and/or improve performance of the coupling conductor 104. The core 402 may be materials such as polyester film or ferrite. The coils 402 can have first and second ends 406. The connecting cable 308 can extend from one or both of ends 406.

As described with respect to FIG. 3, the receiver assembly 301 can be placed in close proximity or attached to the TEC 120 using a fastener 304 or by the methods of attaching the receiver assembly 301 to the TEC 120. Housing 302 is configured to enclose and protect the coils 402 of the coupling wire 302 and an optional core 404.

The respective coils 402 can have legs 410 that extend along the longitudinal axis of the TEC 120 and parallel to the conductor inside the TEC 120 (e.g., core conductor 122 shown in FIG. 2). In one or more embodiments, the respective coils 402 are configured so that its legs 410 form a large majority of the coil 402 and extend parallel to the conductor inside the TEC 120, with only a very small minority of the coil 402 forming a bend 408 at a top and bottom of the coil 402.

In one or more embodiments, the large majority of the coil 402 formed of the legs 410 can be as short as 1 inch (2.54 cm) long, or forming 70% of the coil 402. In one or more embodiments, the large majority of the coil 402 formed of the legs 410 can be more than approximately 3 feet (91.44 cm) in length, or forming 90% of the coil 402. In one or more embodiments, the large majority of the coil 402 formed of the legs 410 can be more than approximately 99% of the coil 402. In one or more embodiments, the large majority of the coil 402 formed of the legs 410 can be as much as 40 feet (121.92 cm) in length, or forming nearly 100% of the coil 402.

In one or more embodiments, the small minority of the coil 402 formed of the bends 408 can be less than approximately one inch, or forming 30% of the coil 402. In one or more embodiments, the small minority of the coil 402 formed of the bends 408 can be less than approximately 0.060 inch (0.15 cm), or forming 10% of the coil 402. In one or more embodiments, the small minority of the coil 402 formed of the bends 408 can be less than approximately 0.020 inch (0.05 cm), or forming less than 1% of the coil 402.

Once deployed, the downhole devices 306 can remain as part of a downhole completion for many years. The downhole environment is a harsh environment, containing high pressures, high temperatures, and corrosive and conductive fluids. Furthermore, once deployed, the downhole device 306 can often be inaccessible for repair or replacement. Hence, there is severe fallout associated with risks of a possible short circuit in a downhole device that has a direct electrical connection to the core conductor of the TEC, as the failed device associated with a splice or other penetration of the TEC's pressure integrity can render the entire system of TEC and attached devices inoperable. Further, a failure at any one of such splice points can introduce fluid into the core of the TEC, shorting the conductor to the outer tubular 126 (as shown in FIG. 2), which can cause the entire system of TEC and attached devices to fail to operate.

Using the disclosed proximity coupling, even if the downhole device 306 were to fail or have a short circuit, the effect to the TEC 120 would be negligible due to power draw limiting effects inherent in the inefficient coupling method used between the TEC conductor 122 and the coupling conductor 104. Additionally, the risk of such a failure or short circuit is reduced due to elimination of a need to breach pressure integrity or an enclosure of the TEC 120. The number of downhole devices 306 can be increased without materially affecting system reliability. If power requirements for the downhole devices 306 are increased, additional power can be introduced to the TEC 120 from the surface without a need to reconfigure the system.

A system is provided to inductively couple a downhole device to a tubing encased conductor (TEC). The receiver has an elongated housing, wherein the housing is configured to be arranged physically proximate or touching an outer surface of the TEC. A coupling conductor is disposed within the housing and extending along a longitudinal axis of the housing. The coupling conductor is configured to extend along the longitudinal axis and in close proximity to a core conductor housed within the TEC when the housing is arranged physically proximate or touching the outer surface of the TEC to expose the coupling conductor to a magnetic field formed externally to the TEC to excite a current in the coupling conductor.

In one or more embodiments, the current is used to provide available power or for one-way or two-way communication via the coupling conductor.

In one or more embodiments, the receiver further includes a device coupling configured to electrically couple the downhole device to the coupling conductor and delivering the current to the downhole device.

In one or more embodiments, the receiver can be physically coupled to the TEC by a TEC retainer. The TEC retainer physically couples the receiver's housing to an outer surface of the TEC without penetrating the outer tubular 126 (shown in FIG. 2) that contains pressure within the TEC to obtain physical proximity between the coupling conductor and the magnetic field, and the housing is in physical contact with the outer surface of the TEC or is physically proximate to but not in physical contact with the outer surface of the TEC.

In one or more embodiment, the TEC retainer can include at least one of a clamp, band, bolt, adhesive, and metallic or non-metallic strapping type material that wraps about the receiver and the TEC.

In one or more embodiments, the receiver can be mounted next to the TEC or the receiver can be mounted in a groove or channel provided in a downhole piece of equipment to achieve the physical and/or electrical coupling.

In one or more embodiments, the current can provide a signal that is encoded to provide communication between the TEC and the downhole device.

In one or more embodiment, the device coupling can include at least one of a device cable and a port. The device cable can be coupled at a first end to the coupling conductor and at a second end to the downhole device and has sufficient length for the downhole device to be located remote from the receiver. The port can be mounted within the housing and can be physically and/or electrically couplable with an interface of the downhole device.

In one or more embodiments, the coupling conductor can be configured to extend substantially parallel to the conductor housed within the TEC, at least partially surround the TEC, include a plurality of coils, include a plurality of coils that at least partially surround the TEC, and/or include coils having legs that form a large majority of the coil and extend parallel to the conductor housed within the TEC with only a very small minority of each coil forming a bend at a top and bottom of the coil.

In accordance with aspects of the disclosure, a method is provided to inductively couple a downhole device to a tubing encased conductor (TEC). The method includes arranging a receiver relative to a TEC to expose a coupling conductor of the receiver to a magnetic field formed external to the TEC. The coupling conductor is disposed within an elongated housing of the receiver and extends along a longitudinal axis of the housing. The receiver is arranged with its housing physically proximate or touching an outer surface of the TEC, so that the coupling conductor is in close proximity to a core conductor housed within the TEC and the coupling conductor is oriented and formed for at least a majority of the coupling conductor to extend parallel to the core conductor, wherein a current is excited in the coupling conductor in response to the coupling conductor being exposed to the magnetic field.

In one or more embodiments, the method can include providing at least one of power, one-way communication, or two-way communication via the current excited in the coupling conductor.

In one or more embodiments, the method can include electrically coupling the downhole device to the coupling conductor for the downhole device to receive the current.

In one or more embodiments, arranging the receiver can include physically coupling the receiver to an outer surface of the TEC without penetrating a pressure containing tube of the TEC.

In one or more embodiments, physically coupling the receiver can include at least one of clamping, using a band, bolting, adhesively attaching, wrapping about the receiver and the TEC, and mounting the receiver next to the TEC to achieve physical proximity and electrical coupling.

In accordance with further aspects of the disclosure, a coupling ensemble is provided to inductively couple a downhole device to a tubing encased conductor (TEC). The coupling ensemble includes a receiver having an elongated housing and a coupling conductor disposed within the housing and extending along a longitudinal axis of the housing, a downhole device, and a device coupling to electrically couple the downhole device to the receiver conductor. Once physically proximate and electrically coupled to the TEC, the coupling conductor extends longitudinally and in close proximity to a core conductor housed within the TEC to expose exposing the coupling conductor to a magnetic field formed externally to the TEC to excite a current in the coupling conductor.

In one or more embodiments, the downhole device receives the current via the device coupling.

In one or more embodiments, the receiver can be physically coupled to an outer surface of the TEC by a TEC retainer without penetrating a pressure containing tube of the TEC to obtain physical proximity between the coupling conductor and the magnetic field.

In one or more embodiments, the housing can be in physical contact with the outer surface of the TEC or can be physically proximate to but not in physical contact with an outer surface of the TEC.

In one or more embodiments, the downhole device can include an encoder and/or decoder that is configured to decode a signal received via the current and/or to encode a signal for transmission via the TEC, or other method, to a remote system disposed in communication with the TEC.

In one or more embodiments, the device coupling can be an electrical cable having sufficient length for the downhole device to be located remote from the receiver, or the device coupling can include a port mounted within the housing, and the downhole device includes an interface configured to physically and/or electrically mate with the port to establish the electrical coupling.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the illustrated embodiments, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A receiver to inductively couple a downhole device to a tubing encased conductor (TEC), the receiver comprising:
an elongated housing, wherein the housing is configured to be arranged physically proximate or touching an outer surface of the TEC; and
a coupling conductor disposed within the housing and extending along a longitudinal axis of the housing, the coupling conductor is configured to extend along the longitudinal axis and in close proximity to a conductor housed within the TEC when the housing is arranged physically proximate or touching the outer surface of the TEC to expose the coupling conductor to a magnetic field formed externally to the TEC to excite a current in the coupling conductor, wherein the coupling conductor is positionable to at least partially surround the TEC, and wherein the coupling conductor comprises at least one coil comprising a magnetic axis perpendicular to a longitudinal axis of the TEC.

2. The receiver of claim 1, wherein the current is used to provide power or for one-way or two-way communication via the coupling conductor.

3. The receiver of claim 1, further comprising a device coupling configured to electrically couple the downhole device to the coupling conductor and delivering the current to the downhole device.

4. The receiver of claim 3, wherein the device coupling includes at least one of a device cable and a port, wherein the device cable is coupled at a first end to the coupling conductor and at a second end to the downhole device and has sufficient length for the downhole device to be located remote from the receiver, and wherein the port is mounted within the housing and is physically and/or electrically couplable with an interface of the downhole device.

5. The receiver of claim 1, wherein the receiver is physically coupled to an outer surface of the TEC by a TEC retainer without penetrating a pressure containing tube of the TEC to obtain physical proximity between the coupling conductor and the magnetic field, and wherein the housing is in physical contact with the outer surface of the TEC or is physically proximate to but not in physical contact with the outer surface of the TEC.

6. The receiver of claim 5, wherein the TEC retainer includes at least one of a clamp, band, bolt, adhesive, and metallic or non-metallic strapping type material that wraps about the receiver and the TEC.

7. The receiver of claim 1, wherein the receiver is at least one of (a) mounted next to the TEC and (b) mounted in a groove or channel provided in a downhole piece of equipment to achieve physical proximity and electrical coupling.

8. The receiver of claim 1, wherein the current provides a signal that is encoded to provide communication between the TEC and the downhole device.

9. The receiver of claim 1, wherein the coupling conductor is positionable to extend substantially parallel to the conductor housed within the TEC, and wherein the coupling conductor comprises:
a plurality of coils or loops that at least partially surround the TEC, wherein the plurality of coils comprise legs that form a majority of the coil and extend parallel to the conductor housed within the TEC with only a minority of each coil forming a bend at a top and bottom of the coil.

10. A method of inductively coupling a downhole device to a tubing encased conductor (TEC), the method comprising:
arranging a receiver relative to a TEC to expose a coupling conductor of the receiver to a magnetic field formed external to the TEC, wherein the coupling conductor is disposed within an elongated housing of the receiver and extends along a longitudinal axis of the housing, wherein the receiver is arranged with its housing physically proximate or touching an outer surface of the TEC so that the coupling conductor is in close proximity to a core conductor housed within the TEC and the coupling conductor is oriented and formed for at least a majority of the coupling conductor to extend parallel to the core conductor and to at least partially surround the TEC, wherein a current is excited in the coupling conductor in response to the coupling conductor being exposed to the magnetic field, and wherein the coupling conductor comprises at least one coil comprising a magnetic axis perpendicular to a longitudinal axis of the TEC.

11. The method of claim 10, further comprising providing at least one of power, one-way communication, or two-way communication via the current excited in the coupling conductor.

12. The method of claim 10, further comprising electrically coupling the downhole device to the coupling conductor for the downhole device to receive the current.

13. The method of claim 10, wherein arranging the receiver includes physically coupling the receiver to an outer surface of the TEC without penetrating a pressure containing tube of the TEC.

14. The method of claim 13, wherein physically coupling the receiver includes at least one of clamping, banding, bolting, adhesively attaching, wrapping about the receiver and the TEC, and mounting the receiver next to the TEC to achieve physical proximity and electrical coupling.

15. A coupling ensemble to inductively couple a downhole device to a tubing encased conductor (TEC), the coupling ensemble comprising:
a receiver having an elongated housing and a coupling conductor disposed within the housing and extending substantially parallel to a longitudinal axis of the housing;
a downhole device; and
a device coupling to electrically couple the downhole device to the coupling conductor,
wherein, once physically proximate and electrically coupled to the TEC, the coupling conductor extends along and in close proximity to a core conductor housed within the TEC to expose the coupling conductor to a magnetic field formed externally to the TEC to excite a current in the coupling conductor, wherein the coupling conductor is positionable to at least partially surround the TEC, and wherein the coupling conductor comprises at least one coil comprising a magnetic axis perpendicular to a longitudinal axis of the TEC.

16. The coupling ensemble of claim 15, wherein the downhole device receives the current via the device coupling.

17. The coupling ensemble of claim 16, wherein the downhole device is configured to decode a signal received via the current and/or to encode a signal for transmission via the TEC to a remote system disposed in communication with the TEC.

18. The coupling ensemble of claim 15, wherein the receiver is physically coupled to an outer surface of the TEC by a TEC retainer without penetrating a pressure containing tube of the TEC to obtain physical proximity between the coupling conductor and the magnetic field.

19. The coupling ensemble of claim 15, wherein the housing is in physical contact with an outer surface of the TEC or is physically proximate to but not in physical contact with the outer surface of the TEC.

20. The coupling ensemble of claim 15, wherein:
- the device coupling is an electrical cable having sufficient length for the downhole device to be located remote from the receiver, or
- the device coupling includes a port mounted within the housing, and the downhole device includes an interface configured to physically and/or electrically mate with the port to establish the electrical coupling.

* * * * *